United States Patent [19]

Murray

[11] 4,359,935
[45] Nov. 23, 1982

[54] APPARATUS FOR COOKING AND DISPENSING FOOD

[75] Inventor: Sidney J. Murray, Queensland, Australia

[73] Assignee: Ramatian Pty. Ltd., Surfers Paradise, Australia

[21] Appl. No.: 169,762

[22] Filed: Jul. 17, 1980

[30] Foreign Application Priority Data

Nov. 1, 1979 [AU] Australia .............................. PE1159

[51] Int. Cl.$^3$ ............................................ A47J 37/12
[52] U.S. Cl. ........................................ 99/331; 99/336; 99/356; 99/357; 99/407; 221/150 A; 222/305
[58] Field of Search .................. 99/407, 336, 357, 356, 99/443 R, 331; 221/150 A, 264; 222/305, 307, 308

[56] References Cited

U.S. PATENT DOCUMENTS

| | | | |
|---|---|---|---|
| 3,347,425 | 10/1967 | Beushausen | 222/305 |
| 3,448,677 | 6/1969 | Dexters | 99/336 |
| 3,690,247 | 9/1972 | Van Cleven | 99/356 |
| 3,818,820 | 6/1974 | Harris | 99/407 |
| 3,896,715 | 7/1975 | Mascret | 99/356 |
| 3,908,111 | 9/1975 | DuBois | 99/331 |

FOREIGN PATENT DOCUMENTS 1308782  3/1973  United Kingdom .................. 99/357

Primary Examiner—Billy J. Wilhite
Attorney, Agent, or Firm—Schwartz, Jeffery, Schwaab, Mack, Blumenthal & Koch

[57] ABSTRACT

This invention concerns food cooking and dispensing apparatus which includes a container for the foods to be cooked and dispensed, a cooking unit and a food holder. The food holder is movable between a first position in or exposed to the cooking unit. There is also included a metering device which is adapted, when operated, to convey a predetermined quantity of the food from the container to the food holder in its first position. The food holder is such that when moved to its second position it discharges food therein gravitationally to a dispensing unit. The apparatus also includes actuating means for operating the metering device and moving the food holder and also prepaid coin operated means for initiating the action of the actuating means.

8 Claims, 3 Drawing Figures

APPARATUS FOR COOKING AND DISPENSING FOOD

BACKGROUND OF THE INVENTION

This invention relates to an improved apparatus for cooking and dispensing foods.

The general object of the invention is to provide apparatus, operated by pre-payment of coins, for cooking and dispensing foods such as potato chips, for example.

SUMMARY OF THE INVENTION

Other objects achievable in preferred embodiments of the invention are to provide such apparatus which is simple and economical to manufacture, quick and efficient in operation and sturdy and trouble-free in use.

With the foregoing and other objects in view, the invention resides broadly in food cooking and dispensing apparatus including a container for the foods to be cooked and dispensed, a cooking unit, a food holder movable between a first position, in or exposed to the cooking unit, and a second position clear of the cooking unit, a metering device adapted, when operated, to convey a predetermined quantity of the food from the container to the food holder in its first position, the food holder being such that when moved to its second position it discharges food therein gravitationally to a dispensing outlet, actuating means for operating the metering device and moving the food holder, and prepaid coin operated means for initiating the action of the actuating means.

Other features of the invention will become apparent from the following description.

BRIEF DESCRIPTION OF THE DRAWINGS

In order that a preferred embodiment of the invention may be readily understood and carried into practical effect, reference is now made to the accompanying drawings, wherein.

DETAILED DESCRIPTION OF THE EMBODIMENTS OF THE INVENTION

Figure 1:
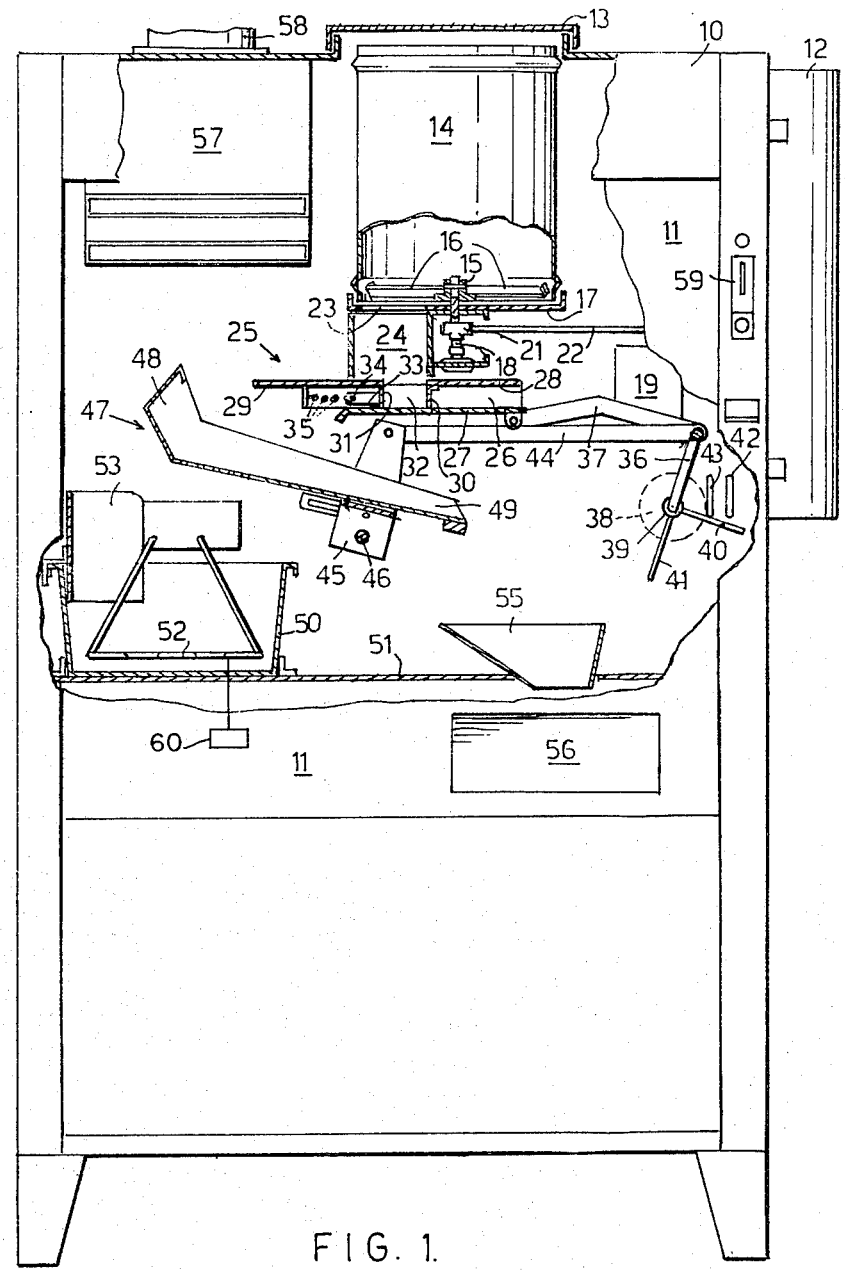
FIG. 1 is a partly broken-away front elevational view of food cooking and dispensing apparatus according to the invention and FIGS. 2 and 3 are views similar to that of FIG. 1, showing the apparatus in different stages of the food cooking and dispensing.

The apparatus illustrated includes a cabinet 10 with a front door 11 normally closing its upper front part. On one side of the cabinet is a cup storage container 12 for a quantity of nested paper cups or the like (not shown).

An opening in the top of the cabinet, normally covered by a top closure 13, gives access to a cylindrical barrel 14 within the cabinet. The barrel is open at top and bottom, a central hub 15 in its lower part being supported by three radiating sweep arms 16 secured to the hub and to the barrel wall. The barrel bottom is close to a horizontal stand plate 17 mounted by the cabinet, the hub 15 being engaged in a vertical drive shaft 18 passing up through the stand plate 17 and driven from a motor at 19 through reduction gear boxes at 20 and 21 and a shaft 22. When the top closure 13 is opened, the barrel 14 may be lifted from the cabinet for cleaning, the hub 15 being slidably but non-rotatably engaged on the shaft.

The barrel 14 can receive a quantity of potato chips, for example, to be cooked and dispensed. These may be introduced to the barrel in part-cooked condition. The barrel is rotated continuously by the motor 19, and a quantity of the chips are fed from the barrel through an opening 23 in the stand plate 17 and into a receptacle 24 consisting of a vertical wall extending down from the periphery of the opening 23, and closed at the bottom by a dispenser indicated generally at 25.

The dispenser consists of a frame 26 having a pair of rigidly interconnected parallel side plates and slidable above a fixed horizontal base plate 27 spaced below the bottom of the receptacle 24. Mounted on the dispenser frame 26 is a fixed top plate 28 and an adjustable top plate 29, with their top faces co-planar and slightly below the bottom of the receptacle 24. The fixed top plate, at the end nearer the adjustable top plate, has a down-turned flange 30, and the adjustable top plate, at the end nearer the fixed top plate, has a down-turned flange 31, these flanges 30 and 31 and the side plates of the dispenser frame 26 defining a measuring chamber 32 which, when the dispenser 25 is in the position shown in FIG. 1, communicates with the receptacle 24 and is closed at the bottom by the base plate 27. The capacity of the measuring chamber may be varied by slidable adjustment of the adjustable top plate 29, lugs 33 extending from the flange 31 having outwardly extending pins 34 engageable in selected ones of corresponding holes 35 in the dispenser frame side plates to hold the adjustable top plate in desired adjusted position.

The dispenser 25 may be slidably reciprocated by a crank 36 connected by a connecting rod 37 to the dispenser frame 26 and driven by an electric motor 38. On the shaft of the crank there is mounted a collar 39 with two radial switch arms 40 and 41, arranged to interact with micro-switches at 42 and 43. Rotation of the crank from its position in FIG. 1 to the position shown in FIG. 2 causes the dispenser to be advanced so that its fixed top plate 28 closes the bottom of the receptacle 24, the measuring chamber 32 being advanced beyond the fixed base plate 27 and so opened at the bottom. Further rotation of the crank 36 causes the dispenser to be fully retracted to the position shown in FIG. 3.

The crank 36 is also connected by a connecting rod 44 to the top part of a cooking arm carrier 45, the lower part of which is pivoted at 46, so that rotation of the crank oscillates the carrier. A cooking arm 47 is mounted in longitudinally adjustable manner on the carrier 45 and consists of a holder 48 with parallel sheet metal sides and a front, bottom and back of perforated sheet metal, and a chute 49 formed integrally with the holder 48. When the crank 36 is turned to the position shown in FIG. 2, the carrier 45 is so turned that the cooking arm holder 48 is brought down into a cooking pot 50 removably supported on a shelf 51 within the cabinet 10 and which contains a quantity of cooking oil which is heated by a thermostatically controlled electric heating element 52 controlled by a thermostat 60. A splash guard 53, U-shaped in plan view, is mounted removably on the cooking pot, and if desired a filter for filtering the cooking oil may be mounted above the cooking arm holder 48 as indicated in broken outline at 54 in FIG. 2.

Figure 3:
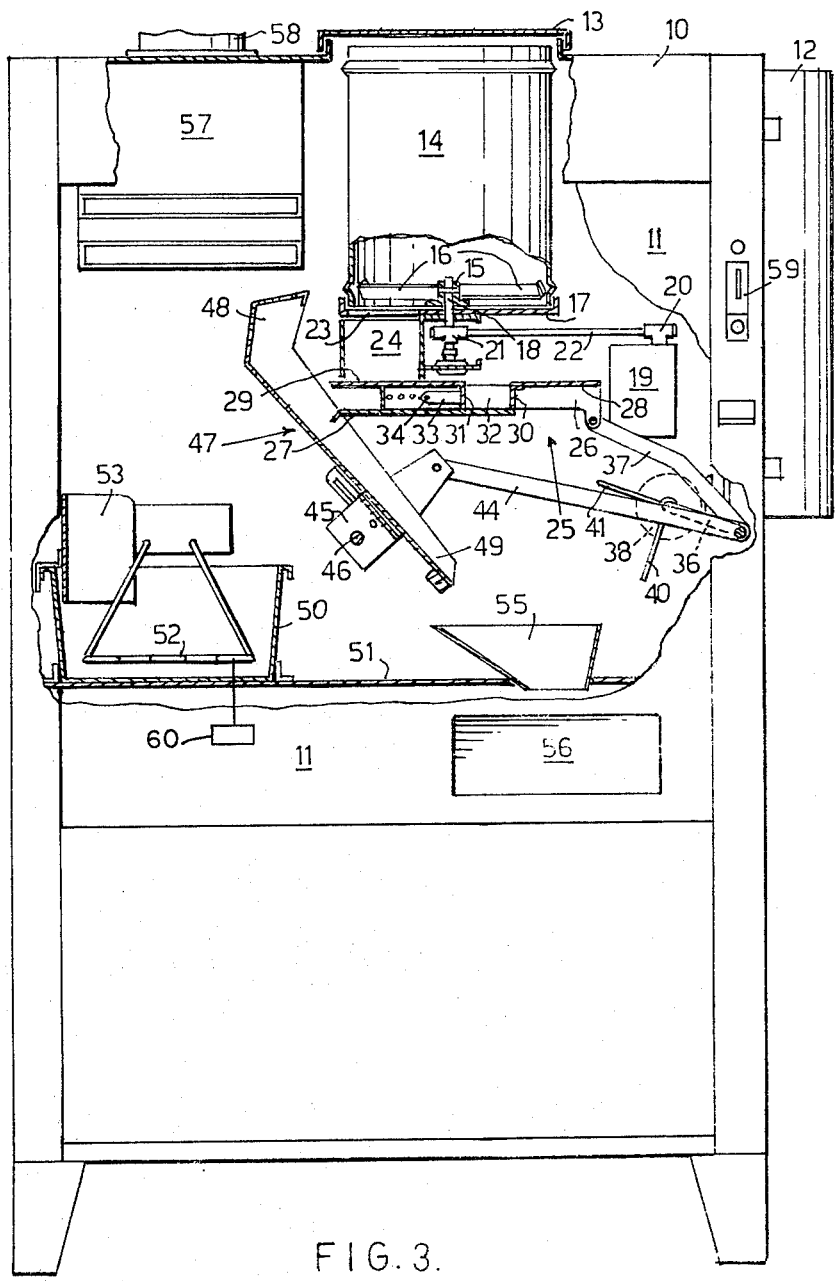

When the crank 36 is turned to the position shown in FIG. 3, the carrier 45 and the cooking arm 47 are so moved that the cooking arm holder 48 is lifted well clear above the cooking pot 50, and the cooking arm chute 49 inclines down from the holder 48 to a funnel 55 passing down through an opening in the shelf 51 and directed to a cup holder recess 56 in the cabinet front.

In the upper part of the cabinet 10 is an exhaust assembly 57 incorporating filters and leading to a flue 58.

Figure 2:
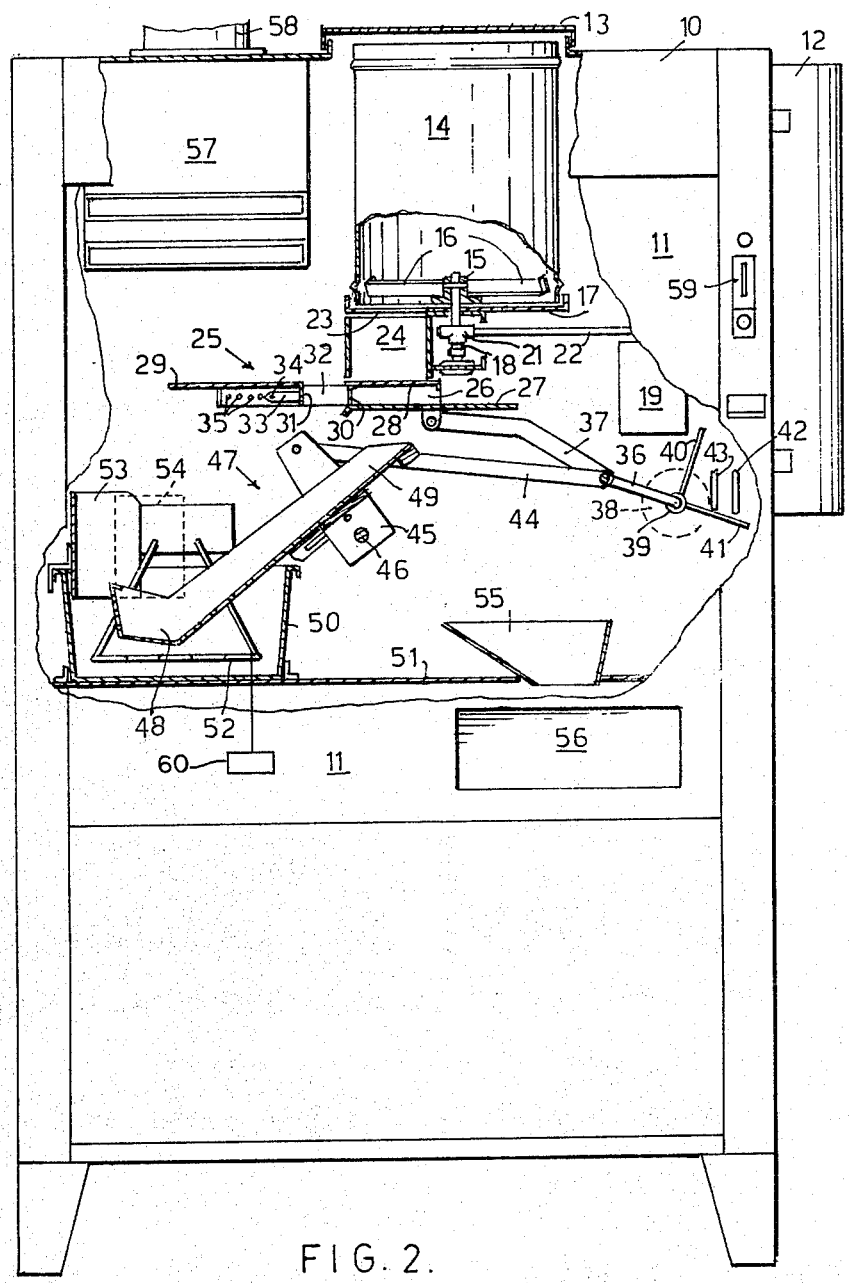

In use, a person using the machine inserts the necessary value in coins in a coin-operated pre-payment device 59 of any suitable known type and takes a paper cup from the container 12, placing it in the cup holder recess 56 beneath the funnel 55. Initially, the cooking arm 47 is, as shown in FIG. 1, in an intermediate position, raised clear of the cooking pot 50 containing heated oil, the barrel 14 is slowly rotating, and potato chips have been fed therefrom into the receptacle 24 and thence into the measuring chamber 32. On the insertion of the appropriate pre-payment, the motor 38 is operated to move the crank 36 to the position shown in FIG. 2, the cooking arm 47 being swung to bring its holder 48 into the heated oil within the cooking pot, 50, the dispenser 25 being advanced so that the measuring chamber is carried beyond the base plate 27 so that its contents are free to drop into the chute 49 and travel down it into the holder 48. The movement of the crank 36 is then halted and any suitable timing device (not shown) its brought into operation. After a predetermined cooking period, the timing device acts to bring the motor 38 into operation to rotate the crank to the position shown in FIG. 3, and to continue such rotation to return the crank back to the initial position shown in FIG. 1, the motor then being halted. The stopping of the motor 38 at the positions shown in FIGS. 1 and 2 is effected by the interaction of the arms 40 and 41 with the micro-switches at 42 and 43.

When the cooking arm 47 is swung to the position of FIG. 3, the cooked potato chips are tipped from the holder 48 down the chute 49 and through the funnel 55 into the cup in the cup receptacle 56. The measuring chamber 32 of the dispenser 25 is again filled, on being brought to rest, and the apparatus is in its initial position for cooking and dispensing a further supply of the potato chips.

Apparatus according to the invention will be found to be simple and economical to manufacture and efficient to operation. It will, of course, be understood that the particular embodiment of the invention herein described and illustrated may be subject to many modifications of constructional detail and design, for example to suit it to the cooking and dispensing of foods other than potato chips. Such modifications, which will be readily apparent to skilled persons, are considered to lie within the scope of the invention hereinafter claimed.

I claim:
1. Apparatus for cooking and dispensing food including:
   a container for foods to be cooked and dispensed, said container comprising a barrel having an open bottom, and means for rotating said barrel about its substantially vertical axis,
   a fixed plate below said barrel and having an opening through which the food can be dispensed from said barrel,
   a cooking unit,
   a food holder movable between a first position in or exposed to the cooking unit and a second position clear of the cooking unit, from which it can gravitationally discharge food to a dispensing outlet,
   a metering device operable to convey a predetermined quantity of the food from said barrel to said food holder when in its first position,
   said metering device including a measuring chamber open at top and bottom and movable over a base member from a receiving position at which it is below said opening in said fixed plate, the bottom of the chamber in such position being closed by the base member, to a discharging position clear of said base member, laterally offset from said opening in said fixed plate, and above said food holder,
   actuating means for operating the metering device and for moving the food holder to its first and second positions, and
   coin operated means for initiating said actuating means.

2. Apparatus according to claim 1 wherein:
   the cooking unit includes a pot for cooking oil, and thermostatically controlled heating means therefor, and
   the food holder includes a perforated bowl and a chute leading therefrom, the bowl being lowered into the cooking pot and the chute leading down to the bowl when the holder is in its first position, the bowl being lifted from the cooking pot, and the chute inclining down from the bowl when the food holder is in its second position.

3. Apparatus according to claim 1 wherein:
   means are provided for adjustably varying the capacity of the measuring chamber.

4. Apparatus according to claim 1 wherein said actuating means comprises a crank member rotatable by a motor adapted to be actuated by coin operation, said crank member being pivotally connected to linkages extending both to said metering device and said food holder, sequential rotation of said crank simultaneously causing said food holder to be immersed in said cooking and said opening in said fixed plate shut off, thereupon causing said food holder to be rotated to its first, discharging position while said opening in said fixed plate remains shut off, and then causing said food holder to be moved to a still elevated position above said cooking unit and below said opening in said fixed plate at which position said measuring chamber returns to its receiving position below said opening in said fixed plate to complete the cycle.

5. Apparatus for cooking and dispensing food including:
   a rotatable container for holding food prior to cooking and dispensing;
   a food holder positioned below said container, and means for pivotally mounting said holder for movement between food receiving, cooking, and dispensing positions;
   a cooking unit into or adjacent to which said food holder can be moved when in its cooking position;
   metering means including a measuring chamber for receiving a predetermined quantity of food from said container, said metering means being constructed and arranged for lateral movement in such a manner that said measuring chamber is above and dispenses food into said food holder during the cooking position of the latter;
   actuating and moving means for said food holder and said metering means, comprising a crank member operatively connected by linkage means both to said food holder and said metering means, said linkage means being such that rotation of said crank member simultaneously moves said metering means into a first food receiving position when said food holder is elevated above said cooking unit, a second food dispensing position when said food holder is moved to its cooking position and a third position isolated from said food container when said food holder is in its dispensing position, and means for actuating said crank member.

6. The apparatus of claim 5 wherein said linkage means comprises a first link pivotally connected at one end to said crank member and at its other end to said metering means, and a second link pivotally connected at one end to said crank member and at its other end to a carrier on which said food holder is mounted whereby said food holder oscillates between said first, second, and third positions.

7. The apparatus of claim 6 wherein said metering means includes a fixed base plate which defines the bottom of a measuring chamber when said metering means is in said first and third positions, and top plate means pivotally attached to said first link and laterally movable relative to said fixed base plate, said top plate means being formed with depending flanges which define with said fixed plate the measuring chamber, said flanges being moved laterally to clear said base plate when said metering means is moved to said second position thereby permitting food in said measuring chamber to gravitate to said food holder.

8. The apparatus of claims 5 or 6, further comprising:
- a pair of radial and circumferentially spaced switch arms mounted on a shaft of said crank member for rotation therewith; and
- micro-switch means mounted so as to interact with said switch arms to effect the dwelling of said food holder in said first and said second positions thereof.

* * * * *